US009163778B2

(12) United States Patent
Zehrer

(10) Patent No.: US 9,163,778 B2
(45) Date of Patent: Oct. 20, 2015

(54) HORIZONTAL LOGISTICS BAR HOLDER FOR LOGISTICS TRAILERS

(71) Applicant: Jeffrey John Zehrer, Sauk Centre, MN (US)

(72) Inventor: Jeffrey John Zehrer, Sauk Centre, MN (US)

(*) Notice: Subject to any disclaimer, the term of this patent is extended or adjusted under 35 U.S.C. 154(b) by 272 days.

(21) Appl. No.: 13/857,097

(22) Filed: Apr. 4, 2013

(65) Prior Publication Data

US 2013/0264441 A1 Oct. 10, 2013

Related U.S. Application Data

(60) Provisional application No. 61/620,274, filed on Apr. 4, 2012.

(51) Int. Cl.
*B60N 3/12* (2006.01)
*F16M 13/00* (2006.01)
*B62D 33/023* (2006.01)

(52) U.S. Cl.
CPC .............. *F16M 13/00* (2013.01); *B62D 33/023* (2013.01)

(58) Field of Classification Search
CPC ............ B60R 7/04; B60R 9/02; B60R 11/06; B62D 33/023
USPC ......... 248/309.1, 307, 201, 205.1; 211/94.01, 211/87.01; 296/37.6, 186.1
See application file for complete search history.

(56) References Cited

U.S. PATENT DOCUMENTS

| | | | | |
|---|---|---|---|---|
| 3,110,536 A * | 11/1963 | Costantini et al. | ............ | 312/350 |
| 3,404,913 A * | 10/1968 | Lahey | ............ | 296/157 |
| 4,917,430 A * | 4/1990 | Lawrence | ............ | 296/37.6 |
| 6,431,668 B1 * | 8/2002 | Reddicliffe | ............ | 312/334.5 |
| 6,619,772 B2 * | 9/2003 | Dierbeck | ............ | 312/334.13 |
| 7,055,892 B2 * | 6/2006 | Buchholz et al. | ............ | 296/186.1 |
| 8,763,820 B2 * | 7/2014 | Hanley | ............ | 211/88.01 |
| 2006/0158005 A1 * | 7/2006 | Brown | ............ | 296/186.1 |
| 2010/0102187 A1 * | 4/2010 | Walraven et al. | ............ | 248/274.1 |
| 2014/0139084 A1 * | 5/2014 | Zehrer | ............ | 312/317.1 |

* cited by examiner

*Primary Examiner* — Todd M Epps

(57) ABSTRACT

A logistics bar holder assembly safely secures logistics bars of logistics trailers horizontally along a wall of the trailer. The logistics bar holder assembly is designed to mimic existing logistics posts. The logistics bars snap into the logistics bar holder assembly exactly as they would in the logistics posts. The bars' placement is quick, easy and secure, in compliance with FMCSA regulations. More importantly, the bars are stored horizontally, high up off the floor, minimizing potential damage by forklifts and/or cargo.

12 Claims, 4 Drawing Sheets

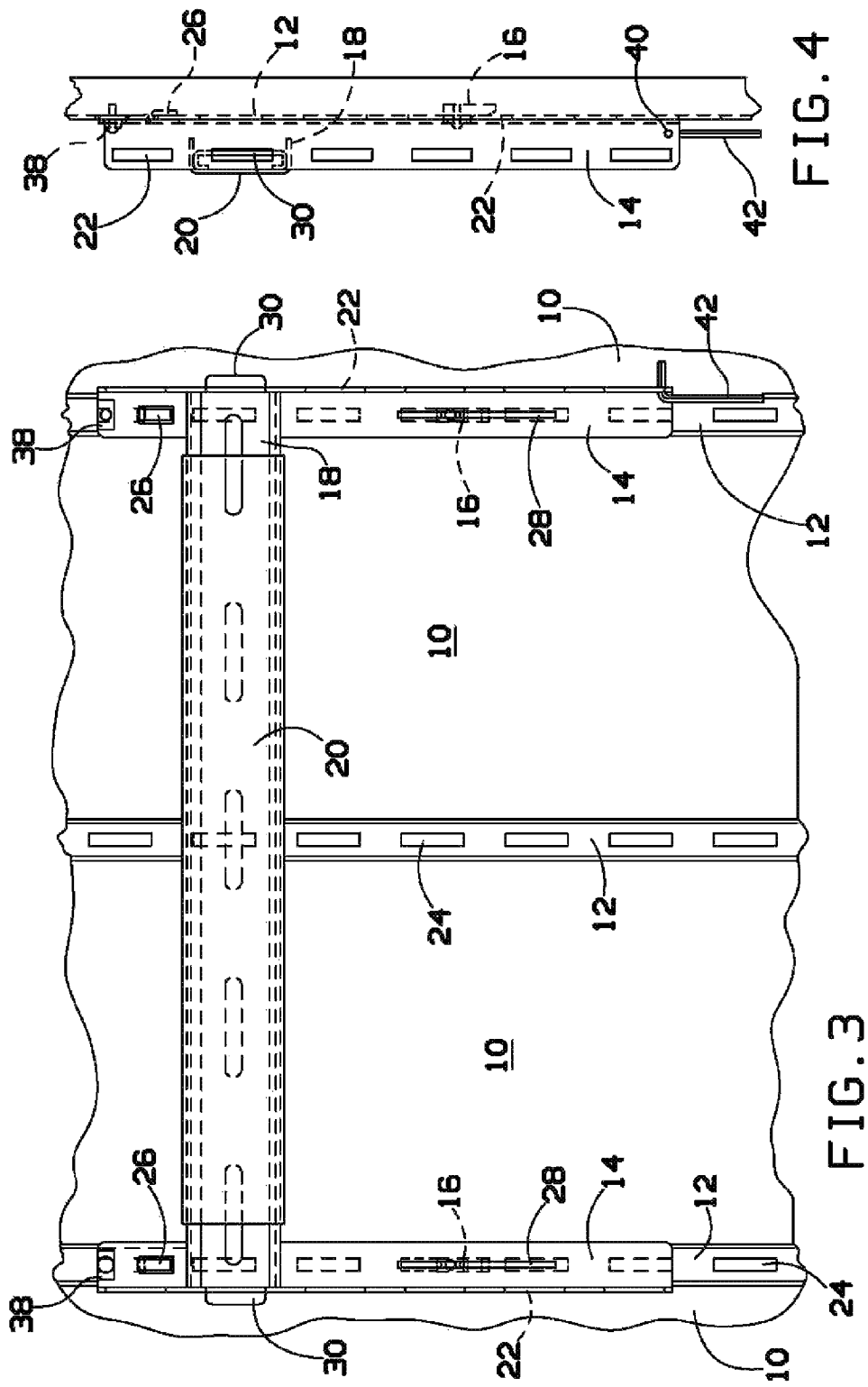

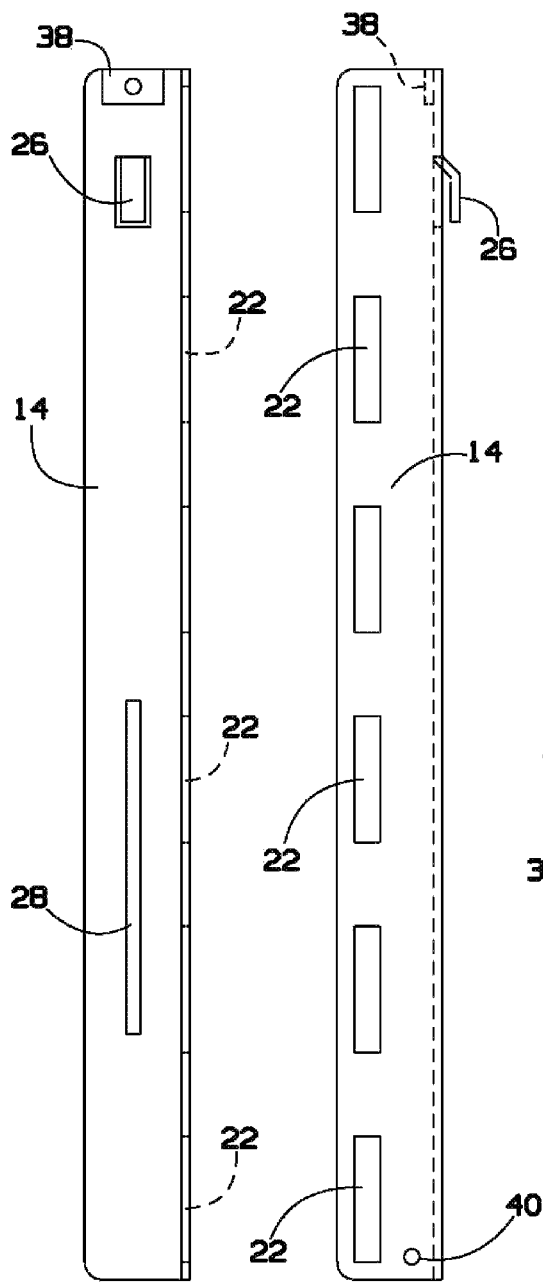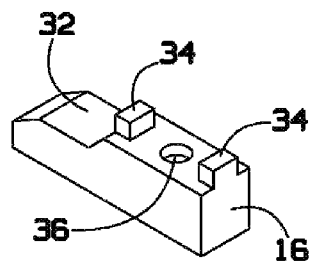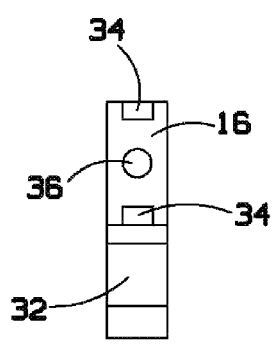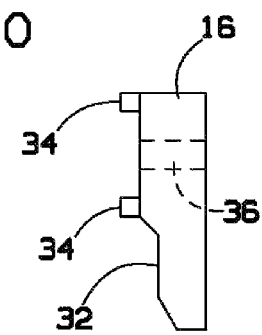

HORIZONTAL LOGISTICS BAR HOLDER FOR LOGISTICS TRAILERS

CROSS-REFERENCE TO RELATED APPLICATION

This application claims the benefit of priority of U.S. provisional application No. 61/620,274, filed Apr. 4, 2012, the contents of which are herein incorporated by reference.

BACKGROUND OF THE INVENTION

The present invention relates to logistics trailer accessories and, more particularly, to a horizontal logistics bar holder for logistics trailers to safely secure logistics bars in transit and when not in use on cargo.

Federal Motor Carrier Safety Administration requires cargo securement devices to be properly stored and secured (FMCSA 392.9(a)(2)). Logistics bars, when not in use, are difficult to store. If left on the floor of the trailer, they could be damaged, in the way of loading and unloading, and potentially damage cargo, and become dangerous in case of an accident. If stored vertically, there is a significant danger of damage from forklifts and/or cargo. If left unsecured, FMCSA allows a violation weight of 7.

Existing logistics bar holders only store the logistics bars vertically and have securing straps or bars to hold the logistics bars in place, thereby increasing the risk of damage to logistics bars, and to or from forklifts and/or cargo. The straps or bars used to hold the logistics bars in place are slow to place and inefficient. Moreover, the existing bar holders do not hold the logistics bars in place on rough terrain.

As can be seen, there is a need for an improved apparatus for safely securing logistics bars in transit and when not in use on cargo.

SUMMARY OF THE INVENTION

In one aspect of the present invention, a logistics bar support assembly, comprises a first logistics bar support bracket having a first mounting side and a first slotted side, the first slotted side extending from the first mounting side; a second logistics bar support bracket having a second mounting side and a second slotted side, the second slotted side extending from the second mounting side; at least one tang extending from the first mounting side and the second mounting side, the at least one tang operable to fit into a logistics post slot to allow the first logistics bar support bracket and the second logistic bar support bracket to hang from a logistics post; and slots disposed in the first slotted side of the first logistic bar support bracket and the second slotted side of the second logistics bar support bracket, wherein the slots mimic the logistics post slots; and a distance between the slots on the first logistics bar support bracket and the slots on the second logistics bar support bracket mimic a distance of opposing logistics posts on opposite walls of a trailer.

In another aspect of the present invention, a logistics bar support assembly, comprises a first logistics bar support bracket having a first mounting side and a first slotted side, the first slotted side extending orthogonally from the first mounting side; a second logistics bar support bracket having a second mounting side and a second slotted side, the second slotted side extending orthogonally from the second mounting side; at least one tang extending from the first mounting side and the second mounting side, the at least one tang operable to fit into a logistics post slot to allow the first logistics bar support bracket and the second logistics bar support bracket to hang from a logistics post; slots disposed in the first slotted side of the first logistics bar support bracket and the second slotted side of the second logistics bar support bracket; and one or more bayonet mounts operable to secure the first and second logistics bar support brackets to the logistics posts, wherein the slots mimic the logistics post slots; and a distance between the slots on the first logistics bar support bracket and the slots on the second logistics bar support bracket mimic a distance of opposing logistics posts on opposite walls of a trailer.

These and other features, aspects and advantages of the present invention will become better understood with reference to the following drawings, description and claims.

BRIEF DESCRIPTION OF THE DRAWINGS

FIG. 3 is a front view of the logistics bar holder assembly of FIG. 1, in use;

FIG. 4 is a side view of the logistics bar holder assembly of FIG. 1, in use;

FIG. 5 is a detailed section view of the logistic bar holder assembly of FIG. 1, illustrating an upper hangar and logistics bar tang assembled with a vertical support;

FIG. 6 is a detailed section view of the logistics bar holder assembly of FIG. 1, illustrating a lower hangar assembly;

FIG. 7 is a front view of the logistics bar holder of the logistics bar holder assembly of FIG. 1;

FIG. 8 is a side view of the logistics bar holder of the logistics bar holder assembly of FIG. 1;

FIG. 9 is a perspective view of a hangar used in the logistics bar holder assembly of FIG. 1;

FIG. 10 is a front view of the hanger of FIG. 9; and

FIG. 11 is a side view of the hanger of FIG. 9.

DETAILED DESCRIPTION OF THE INVENTION

Figure 1:
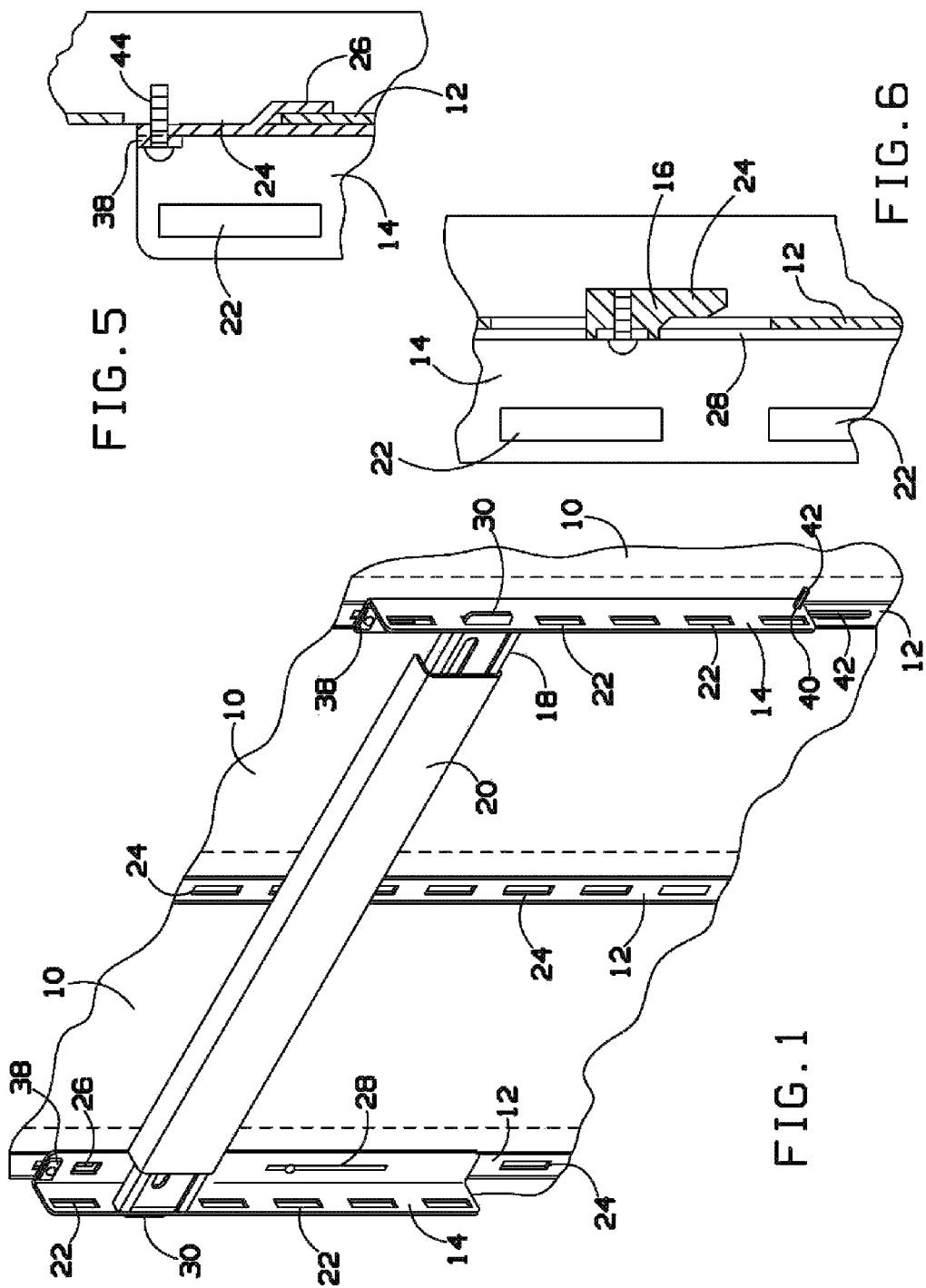
FIG. 1 is a perspective view of a logistics trailer sidewall showing a logistics bar holder assembly, in use, to secure logistics bars according to an exemplary embodiment of the present invention.
Figure 2:
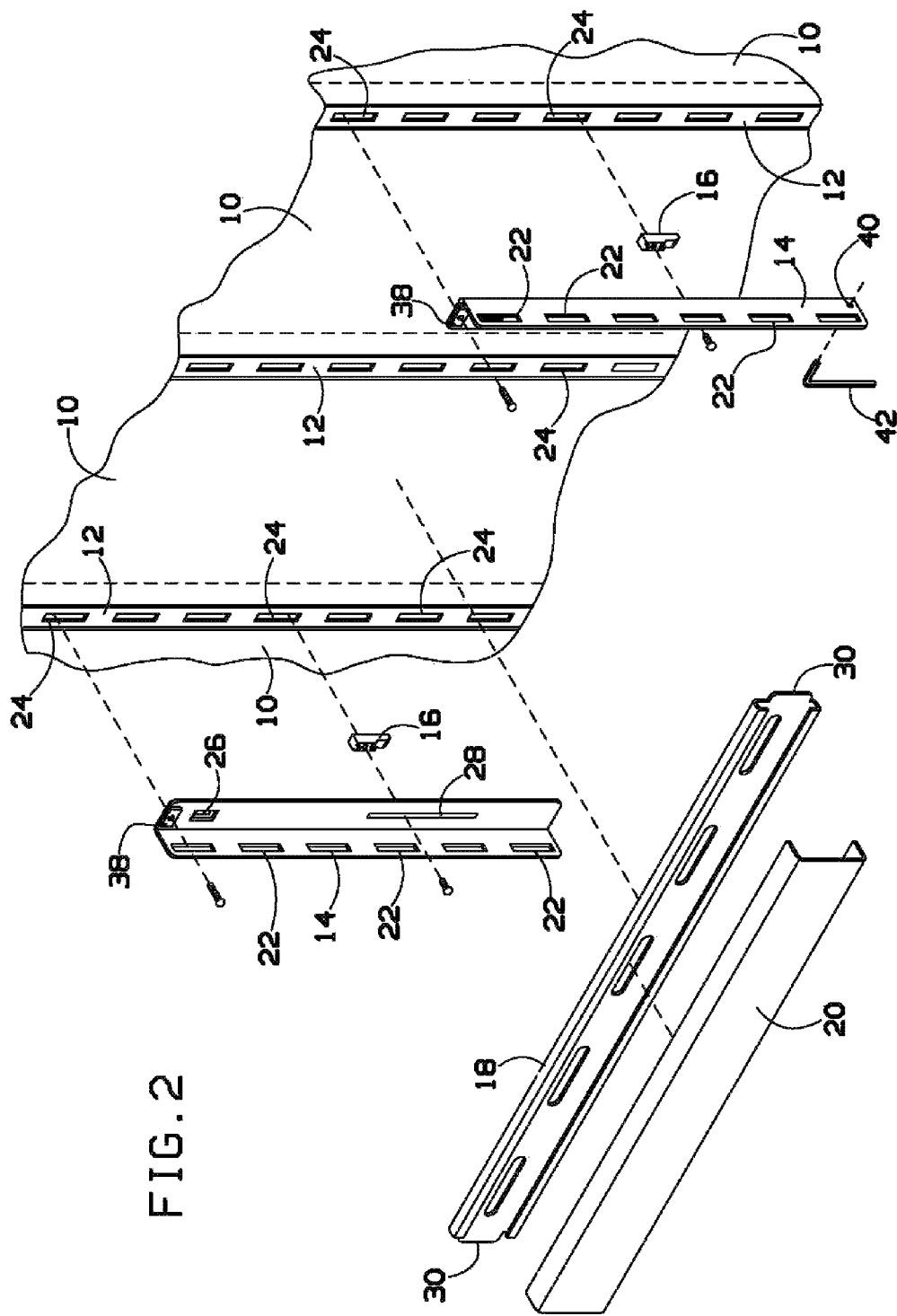
FIG. 2 is an exploded view of the logistics bar holder assembly of FIG. 1, in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a logistics bar holder assembly that safely secures logistics bars in logistics trailers horizontally along a wall of the trailer. The logistics bar holder assembly is designed to mimic existing logistics posts. The logistics bars snap into the logistics bar holder assembly exactly as they would in the logistics posts. The bars' placement is quick, easy and secure. More importantly, the bars are stored horizontally, high up off the floor, minimizing potential damage by forklifts and/or cargo.

Referring now to FIGS. 1 through 11, logistics bars 20 are used in logistics trailers to support or secure a load. When in use, the logistics bars 20 span between logistics posts 12 disposed on side walls 10 of the trailer. The logistics posts 12 have slots 24 formed therein to accept tabs 30 that extend from the logistics bar body 18, as is known in the art. When not in use, the logistics bars 20 need to be secured.

A logistics bar support bracket 14 can be designed with a slotted side, having a plurality of slots 22 formed therein, and a hanging side that includes a hanging mechanism. The slotted side is typically disposed at a 90 degree angle relative to the hanging side. The slots 22 are disposed in the slotted side of the logistics bar support bracket 14 to mimic the slots 24 of the logistics posts 12 of the trailer. The hanging mechanism is operable to permit attachment of the logistics bar support bracket 14 to the logistics post 24 of the trailer.

The logistics bar support bracket 14 can be used, for example, in pairs (a right hand side and a left hand side logistics bar support bracket, as shown, for example, in FIG. 1), where, when the logistics bar support brackets 14 are disposed on appropriate logistics posts 12 in the trailer, the distance between the slots 22 of the logistics bar support brackets is typically approximately 8 feet on center, which mimics the distance between logistics posts 12 on opposite sides of the trailer. Therefore, logistics bars 18 that are used between opposite logistics posts 12, when in use to secure cargo, can be stored along one wall of the trailer with the logistics bar support brackets 14 of the present invention. In some embodiments, left and right end logistics bar support brackets 14 can span a distance approximate twice the length of the logistics bar 18. A middle logistics bar support bracket (not shown) can be designed in a U-shape, with slots on each of the extending U-shaped arms. In this embodiment, a first set of logistics bars 18 can span from the left logistics bar support bracket 14 to the middle U-shape bracket, and a second set of logistics bars 18 from the middle U-shape bracket to the right logistics bar support bracket 14.

While the figures show the logistics bar support bracket 14 having six slots 22, any number of slots can be disposed along the height of the logistics bar support bracket 14. Moreover, while the figures show the logistics bar support bracket 14 having a depth of a single slot 22, the slots could be stacked to provide a logistics bar support bracket with two or more slots deep.

The logistics bar support bracket 14 can be attached to the logistic post 12 in various manners. In some embodiments, two or more adjustable hangers can be attached to hang the logistics bar support bracket. A securing bolt 44 can extend through a the weld nut 38 disposed on a top side of the logistics bar support bracket 14 and can be used to prevent the logistics bar support bracket 14 from jumping out of the slots 24 of the logistics post 12. The bayonet mount 16 can include a mounting hole 36 and alignment blocks/pegs 34 as shown in FIGS. 9 through 11. The bayonet mount 16 can fit into the slot 24 on the logistics post 12 and a locking surface 32 of the bayonet mount 16 can fit behind the logistics post 12 to allow the logistics bar support bracket 14 to hang on the logistics post 12.

The logistics bar support bracket 14 can include one or more logistics bar tangs 26 extending from a backside of the mounting side of the logistics bar support bracket 14. The tangs 26 can be made integral to the logistics bar support bracket 14 and can fit into the slots 24 of the logistics post 12. The tangs 26 are generally used to hang the logistics bar support bracket 14 on the logistics post 12 and support the weight of the logistics bar support bracket 14 and the logistics bars 18 disposed thereon.

In some embodiments, the logistics bar support bracket 14 can include a height adjustment slot 28 where a bayonet mount 16 can be moved to accommodate the logistics post's configuration.

In combination, typically, the logistics bar support bracket 14 can include at least two hanging mechanisms. For example, as shown in Figures, one tang 26 and one adjustable bayonet mount 16 may be used. In other embodiments, two tangs 26 may be used (but must be designed specifically for the spacing of the slots 24 on the logistics posts 12). In still other embodiments, two or more adjustable bayonet mounts 16 may be used.

In some embodiments, the logistics bar support bracket 14 can include a tool holder 40 formed, for example, as a hole in the logistics bar support bracket 14. The tool holder 40 can be used to hold a tool 42, such as an Allen wrench or the like.

It should be understood, of course, that the foregoing relates to exemplary embodiments of the invention and that modifications may be made without departing from the spirit and scope of the invention as set forth in the following claims.

What is claimed is:

1. A logistics bar support assembly, comprising:
   a first logistics bar support bracket having a first mounting side and a first slotted side, the first slotted side extending from the first mounting side;
   a second logistics bar support bracket having a second mounting side and a second slotted side, the second slotted side extending from the second mounting side;
   at least one tang extending from the first mounting side and the second mounting side, the at least one tang operable to fit into a logistics post slot to allow the first logistics bar support bracket and the second logistics bar support bracket to hang from a logistics post; and
   slots disposed along a height of the first slotted side of the first logistics bar support bracket and the second slotted side of the second logistics bar support bracket, wherein the slots mimic the logistics post slots; and
   a distance between the slots on the first logistics bar support bracket and the slots on the second logistics bar support bracket mimics a distance between logistics posts on opposite sides of a trailer.

2. The logistics bar support assembly of claim 1, wherein the distance between the slots on the first logistics bar support bracket and the slots on the second logistics bar support bracket is about 8 feet.

3. The logistics bar support assembly of claim 1, wherein the first slotted side extends at a 90 degree angle from the first mounting side, and the second slotted side extends at a 90 degree angle from the second mounting side.

4. The logistics bar support assembly of claim 1, further comprising one or more bayonet mounts operable to secure the first and second logistics bar support brackets to the logistics posts.

5. The logistics bar support assembly of claim 4, wherein the bayonet mount is adjustable along an adjustment slot in the first and second mounting sides of the first and second logistics bar support brackets.

6. The logistics bar support assembly of claim 1, further comprising a weld nut disposed on a top side of the first and second logistics bar support brackets, wherein the weld nut is operable to permit a bolt to thread therethrough and into the logistics post slot to prevent the logistics bar support assembly from jumping out of the logistics posts.

7. The logistics bar support assembly of claim 1, further comprising a tool holder disposed in the first and second logistics bar support brackets.

8. A logistics bar support assembly, comprising:
   a first logistics bar support bracket having a first mounting side and a first slotted side, the first slotted side extending orthogonally from the first mounting side;
   a second logistics bar support bracket having a second mounting side and a second slotted side, the second slotted side extending orthogonally from the second mounting side;
   at least one tang extending from the first mounting side and the second mounting side, the at least one tang operable to fit into a logistics post slot to allow the first logistics bar support bracket and the second logistics bar support bracket to hang from a logistics post;

slots disposed in the first slotted side of the first logistics bar support bracket and the second slotted side of the second logistics bar support bracket; and one or more bayonet mounts operable to secure the first and second logistics bar support brackets to the logistics posts, wherein the slots mimic the logistics post slots; and a distance between the slots on the first logistics bar support bracket and the slots on the second logistics bar support bracket mimics a distance between logistics posts on opposite sides of a trailer.

9. The logistics bar support assembly of claim 8, wherein the distance between the slots on the first logistics bar support bracket and the slots on the second logistics bar support bracket is about 8 feet.

10. The logistics bar support assembly of claim 8, wherein the bayonet mount is adjustable along an adjustment slot in the first and second mounting sides of the first and second logistics bar support brackets.

11. The logistics bar support assembly of claim 8, further comprising a weld nut disposed on a top side of the first and second logistics bar support brackets, wherein the weld nut is operable to permit a bolt to thread therethrough and into the logistics post slot to prevent the logistics bar support assembly from jumping out of the logistics posts.

12. The logistics bar support assembly of claim 8, further comprising a tool holder disposed in the first and second logistics bar support brackets.

\* \* \* \* \*